United States Patent [19]

Sujaku

[11] Patent Number: 4,491,914
[45] Date of Patent: Jan. 1, 1985

[54] INITIAL PROGRAM LOAD SYSTEM

[75] Inventor: Jiro Sujaku, Fujisawa, Japan

[73] Assignee: Mitsubishi Denki Kabushiki Kaisha, Tokyo, Japan

[21] Appl. No.: 445,473

[22] Filed: Nov. 30, 1982

[30] Foreign Application Priority Data

Dec. 4, 1981 [JP] Japan .............................. 56-195247

[51] Int. Cl.³ .............................................. G06F 1/00
[52] U.S. Cl. .................................................. 364/200
[58] Field of Search ... 364/200 MS File, 900 MS File

[56] References Cited

U.S. PATENT DOCUMENTS 4,237,533  12/1980  Mills et al. .......................... 364/200

Primary Examiner—Raulfe B. Zache
Attorney, Agent, or Firm—Wenderoth, Lind & Ponack

[57] ABSTRACT

This invention provides an initial program load system wherein, even when one IPL device has gone wrong, other IPL devices are automatically operated in succession instead of the faulty IPL device, whereby the automatic restoration of a whole system including the IPL system is prevented from being delayed by the fault of the IPL device.

4 Claims, 4 Drawing Figures

INITIAL PROGRAM LOAD SYSTEM

BACKGROUND OF THE INVENTION

This invention relates to an initial program load (hereinbelow, abbreviated to "IPL") system which loads an electronic computer system with its initial program.

A prior art IPL system has been as shown in FIG. 1. Referring to the figure, numeral 1 designates a central processing unit (hereinbelow, abbreviated to "CPU"), numeral 2 a switch which is built in the CPU 1 and which appoints an IPL device, numerals 3 and 4 magnetic disc devices respectively, and numeral 5 a magnetic tape device. In the following description, it is assumed that the initial program is stored in the magnetic disc device 3, namely, that the magnetic disc device 3 constructs the IPL device. FIG. 2 is a flowchart which shows the flow of IPL operations in the prior art, and in which numerals 20-24 indicate respective steps.

In general, the IPL operations are started by manually actuating the IPL switch. However, in a case where power supply to the computer system has turned "off" for any reason and has thereafter been restarted, the IPL operations are automatically performed. More specifically, the IPL operations are started at the step 20 in FIG. 2. The IPL device 3 is set to start by the step 21, so as to read out the initial program and the IPL operations store it in the CPU 1. At the subsequent step 22, whether or not the readout operation has been normally executed is decided by checking the status of the CPU 1 after the readout, or it is decided depending upon whether or not there is a response from the the IPL device 3 within a predetermined period of time since the start of the readout has been set. When the result of the decision at the step 22 is NO, the operating flow shifts to the step 23, which stops the computer system.

Only in a case where the result of the decision at the step 22 is YES, the operation of the computer system is started by the initial program. That is, under the control of the initial program loaded first, the next program is loaded. This corresponds to the step 24. Before the IPL has been executed, any information is not produced at all, and hence, any program to be utilized does not exist till the end of the load of the least required information. Therefore, the computer system needs to be processed by hardware till then. Accordingly, when the IPL device is abnormal, the continuation of the processing is impossible, and the operating flow cannot avoid shifting to the step 23. Moreover, in some kinds of abnormalities, the computer system repeats the above processing without stopping.

The procedure of the prior art IPL is as stated above. In order to start the IPL again after the step 23, the manual operation must be resorted to. In addition, in a system which is expected to automatically return to normalcy from the momentary interruption of a power source; when the step 23 has been reached due to any fault of the IPL device, the intervention of the manual operation is indispensable. This leads to the disadvantage that, in cases of an unmanned operation etc., it takes a very long time before the system is restarted.

SUMMARY OF THE INVENTION

This invention has been made in order to eliminate the disadvantages of the prior art system as described above. That is, the invention has for its object to provide an IPL system wherein even when one IPL device has gone wrong, one or more different IPL devices operate instead of the faulty IPL device in successive fashion, so that the automatic restoration of a whole system including the IPL system is not delayed by the fault of the IPL device.

In one aspect of performance of this invention, an IPL system comprises the first load step of stating automatically under a predetermined condition and loading a computer with an initial program from a first device among a plurality of nonvolatile memories each storing the initial program, the second load step of loading the computer with the initial program from a second device among said plurality of nonvolatile memories when any fault has been detected in said first load step or when the load operation does not end within a predetermined period of time, and the step of loading the computer with the initial program by successively using remaining devices among said plurality of nonvolatile memories, when any fault has been detected in said second load step or when the load operation does not end within a predetermined period of time.

DESCRIPTION OF THE PREFERRED EMBODIMENT

Figure 1:
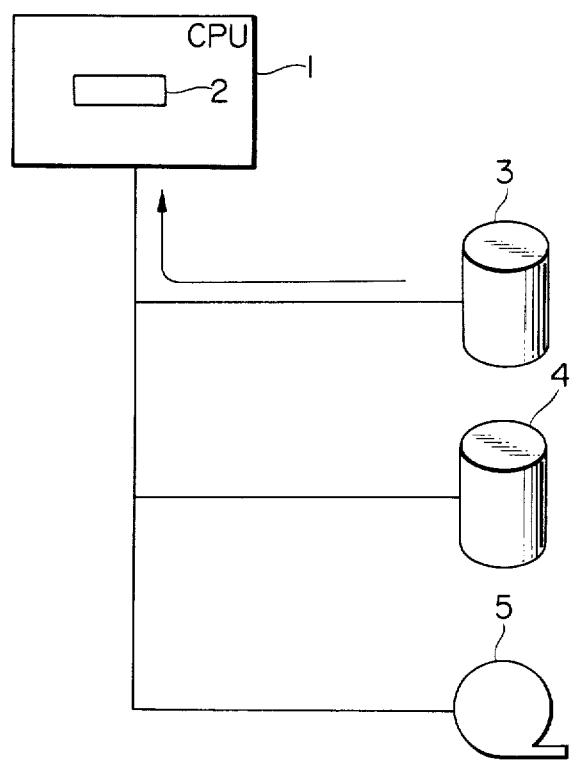
FIG. 1 is a block diagram for explaining a prior art initial program load system.
Figure 2:
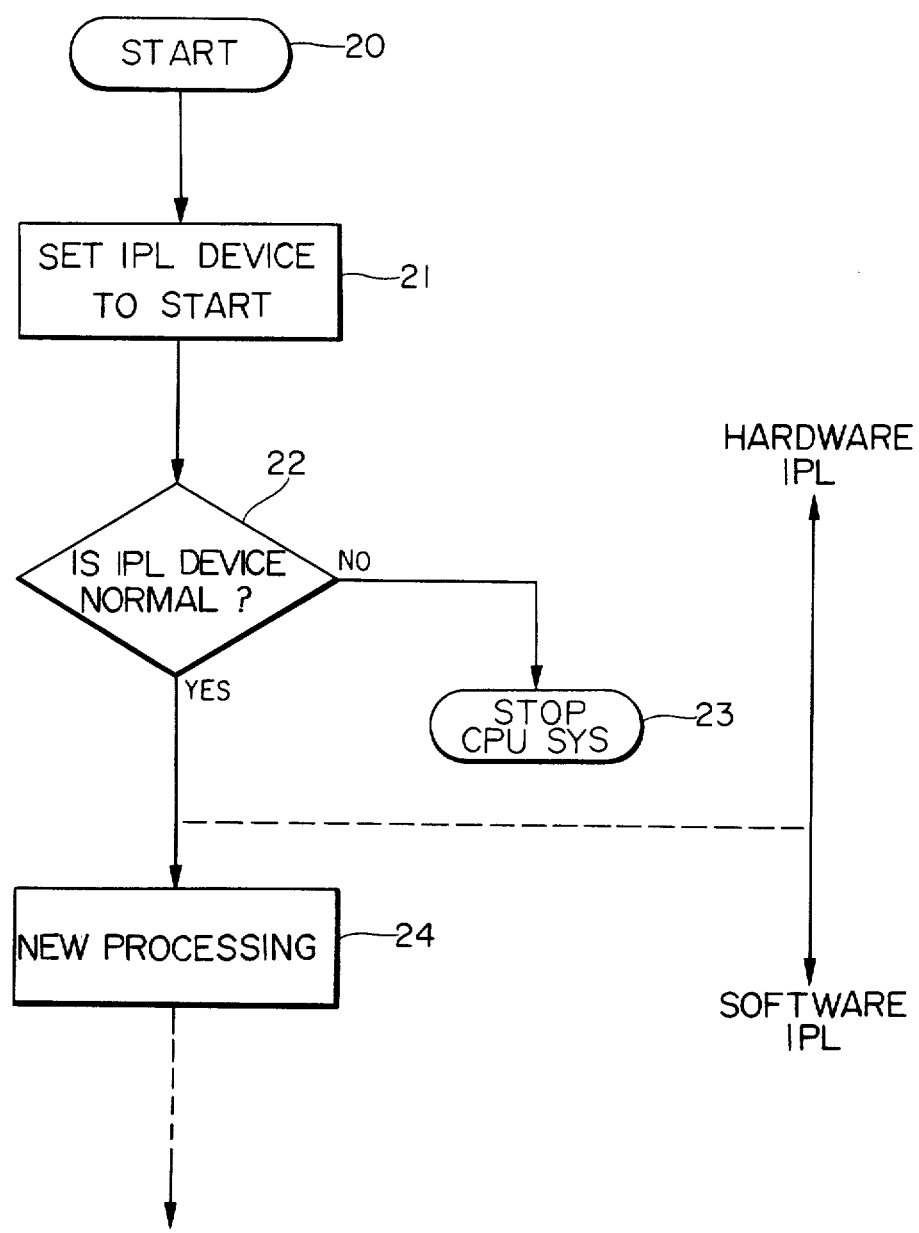
FIG. 2 is a flowchart showing the flow of operations in the prior art system.
Figure 3:
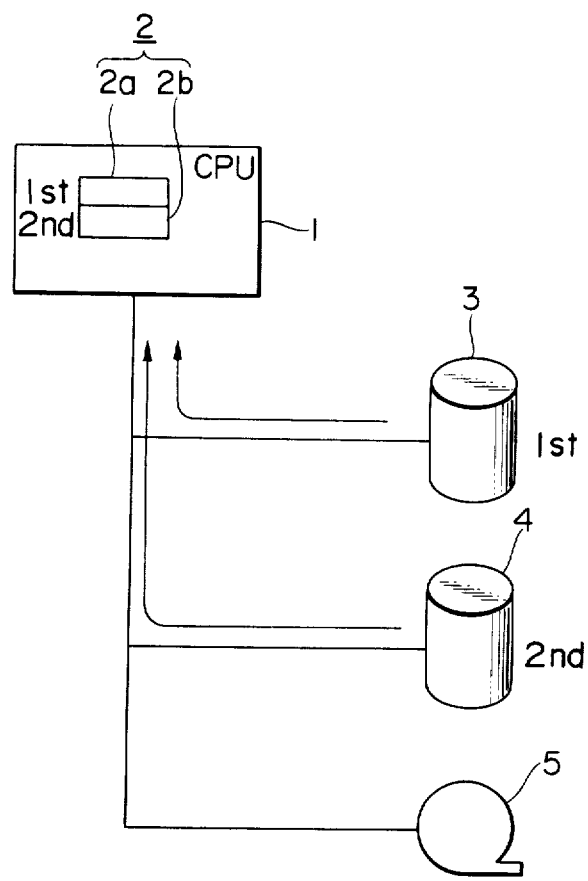
FIG. 3 is a block diagram explaining embodiment of an initial program load system according to this invention.
Figure 4:
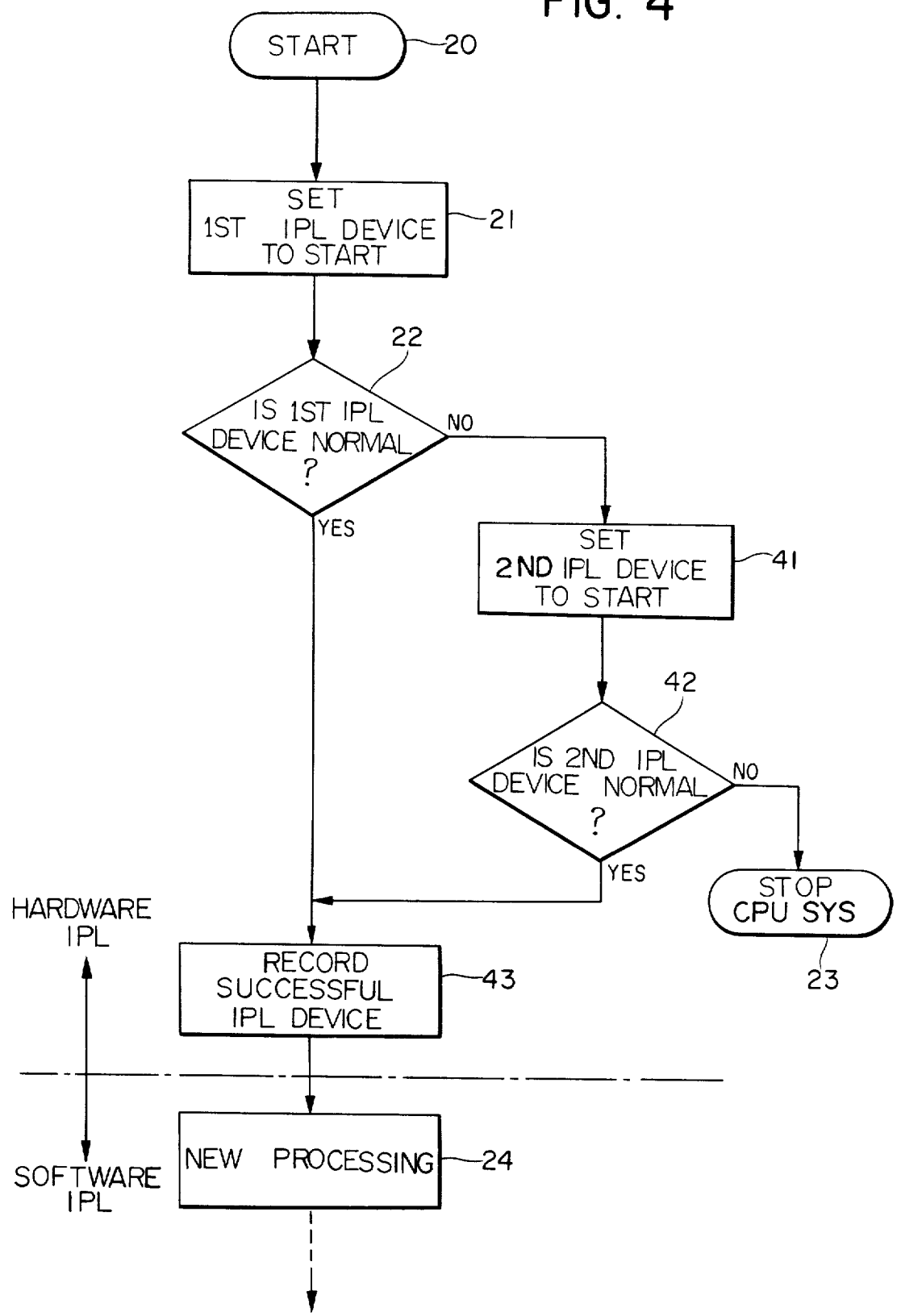
FIG. 4 is a flowchart showing the flow of operations in the system of FIG. 3.

Now, the system of this invention will be described with reference to the drawings. FIG. 3 is a block diagram which shows an embodiment of this invention, and in which the same symbols as in FIG. 1 denote the same or corresponding parts. The IPL devices appointing switch 2 is composed of a first switch 2a and a second switch 2b. In the arrangement of FIG. 3, the magnetic disc device 3 constructs a first IPL device, while the magnetic disc device 4 constructs a second IPL device. The switch 2a appoints the first IPL device 3, while the switch 2b appoints the second IPL device 4. FIG. 4 is a flowchart which shows the flow of operations in the system of this invention, and in which the same numerals as in FIG. 2 indicate the same or corresponding steps. Numerals 41, 42 and 43 indicate steps added anew. At the step 21 in FIG. 4, the first IPL device 3 is set to start by the IPL devices appointing switch 2a. The operations of the steps 20, 21 and 22 are similar to those in the case of FIG. 2. In a case where the result of the decision at the step 22 is NO, the second IPL device 4 is set to start by the IPL devices appointing switch 2b, to shift the operating flow to the steps 41 and 42. When the result of a decision at the step 42, which decides if the second IPL device 4 is normal, is NO, the operating flow shifts to the step 23 for the first time so as to stop the computer system. In either case, the IPL device having succeeded in the IPL operations is recorded at the step 43. The same initial program are stored in the first IPL device 3 and the second IPL device 4. As understood by comparing FIG. 2 with FIG. 4, in this invention, the step 23 is reached to stop the system only in the case where the decisions are NO at both the steps 22 and 42. The probability of occurrence of this case is much lower than that of the case where the decision of NO is made only at the step 22.

Although, in the above embodiment, the steps 20, 21, 22, 41, 42, 23 and 43 have been described as the hardware operations, they may of course be controlled with a microprogram. In addition, although the use of the magnetic disc devices 3 and 4 as the IPL devices has been exemplified, other magnetic memories, a card reader with cards, etc. may be used as long as they are nonvolatile memories. It is also possible to construct different IPL devices by employing different memory areas within an identical magnetic disc device. Further, the IPL devices storing the same initial programs may be disposed in any number.

Besides, the operations illustrated in FIG. 4 can be preset without disposing the IPL appointing switches 2a and 2b shown in the embodiment.

As set forth above, according to this invention, the initial program of a system is stored in a plurality of IPL devices, so that the possibility of the automatic restoration of the system from the momentary interruption of a power source can be remarkably enhanced. In addition, system-down attributed to local faults can be prevented as far as possible, and a computer system having a high rate of operation can be provided.

What is claimed is:

1. An initial program load system comprising the first load step of starting automatically under a predetermined condition and loading a computer with an initial program from a first device among a plurality of nonvolatile memories each storing the initial program, the second load step of loading the computer with the initial program from a second device among said plurality of nonvolatile memories when any fault has been detected in said first load step or when the load operation does not end within a predetermined period of time, and the step of loading the computer with the initial program by successively using remaining devices among said plurality of nonvolatile memories, when any fault has been detected in said second load step or when the load operation does not end within a predetermined period of time.

2. An initial program load system according to claim 1 wherein said plurality of nonvolatile memories are nonvolatile storage devices each of which stores the initial program.

3. An initial program load system according to claim 1 wherein said plurality of nonvolatile memories are different memory areas of a single nonvolatile storage device, the initial program being stored in each of said memory areas.

4. An initial program load system comprising the first load step of starting automatically under a predetermined condition and loading a computer with an initial program from a first device among a plurality of nonvolatile memories each storing the initial program, the second load step of loading the computer with the initial program from a second device among said plurality of nonvolatile memories when any fault has been detected in said first load step or when the load operation does not end within a predetermined period of time, the step of loading the computer with the initial program by successively using remaining devices among said plurality of nonvolatile memories, when any fault has been detected in said second load step or when the load operation does not end within a predetermined period of time, and the step of recording that device among said nonvolatile memories which has succeeded in the initial program load operation.

* * * * *